May 10, 1960
H. S. MYERS ET AL
THRUST CHAMBER WITH INTEGRATED COOLING
AND STRUCTURAL MEMBERS
2,935,841
Filed June 18, 1956
2 Sheets-Sheet 1
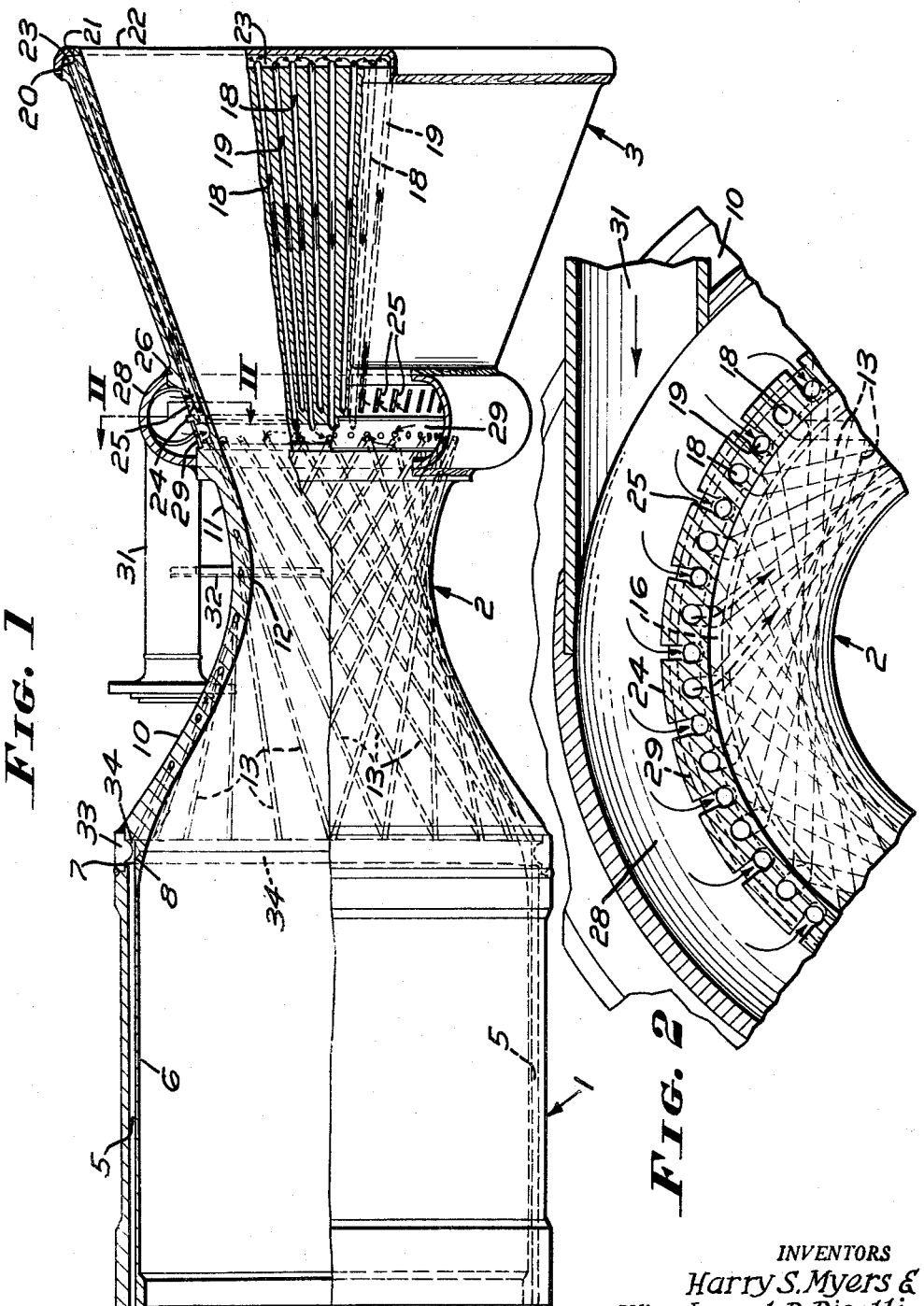
INVENTORS
Harry S. Myers &
BY: Joseph R. Piselli,
Beau, Brooks, Buckley & Beau,
ATTORNEYS.

May 10, 1960

H. S. MYERS ET AL 2,935,841

THRUST CHAMBER WITH INTEGRATED COOLING AND STRUCTURAL MEMBERS

Filed June 18, 1956

INVENTOR.
Harry S. Meyers &
BY: Joseph R. Piselli,

Beau, Brooks, Buckley & Beau,
ATTORNEYS.

United States Patent Office 2,935,841
Patented May 10, 1960

2,935,841

THRUST CHAMBER WITH INTEGRATED COOLING AND STRUCTURAL MEMBERS

Harry S. Myers, Arcadia, Calif., and Joseph R. Piselli, Buffalo, N.Y., assignors to Bell Aircraft Corporation, Wheatfield, N.Y.

Application June 18, 1956, Serial No. 592,033

7 Claims. (Cl. 60—35.6)

This invention relates generally to the propulsion art, and more specifically to a new and useful thrust chamber for rocket motors and the like.

In the development of thrust chambers for this purpose a serious problem has been presented by the extremely high temperatures to which the thrust chamber is subjected during operation, and a satisfactory solution to this problem has, in many instances at least, proven to be difficult. Various arrangements for cooling the thrust chamber during operation have been suggested, but such arrangements generally either do not provide sufficient cooling for many purposes, or in an effort to do so weaken the thrust chamber to the point where it does not possess sufficient strength for many purposes, or add greatly to the weight of the thrust chamber, or of the rocket of which it is a part, which is highly undesirable and in many instances can not be tolerated.

A primary object of this invention is to provide a thrust chamber possessing maximum strength incorporating means providing a maximum cooling effect thereon.

Another object of the invention is to provide the foregoing in a relatively light-weight structure which is readily and relatively inexpensively manufactured and assembled.

In one aspect thereof, a thrust chamber in accord with this invention is characterized by an integral construction of the thrust chamber sections and the cooling passages therethrough, the chamber sections being formed of a material characterized by a relatively high degree of heat conductivity.

In another aspect thereof, a thrust chamber in accord with this invention is characterized by the provision of a coolant intake manifold at a reduced diameter portion intermediate the ends thereof, with cooling passages extending therefrom through the nozzle section and the divergent nozzle outlet section.

The foregoing and other objects, advantages and characterizing features of a thrust chamber in accord with the instant invention will become clearly apparent from the ensuing detailed description of a presently preferred embodiment thereof, reference being had to the accompanying drawings forming a part hereof and illustrating such embodiment wherein;

Fig. 1 is in part a side elevational view and in part a longitudinal sectional view of the thrust chamber;

Fig. 2 is a fragmentary, transverse sectional view taken about on line II—II of Fig. 1 and enlarged to show details;

Figure 4:
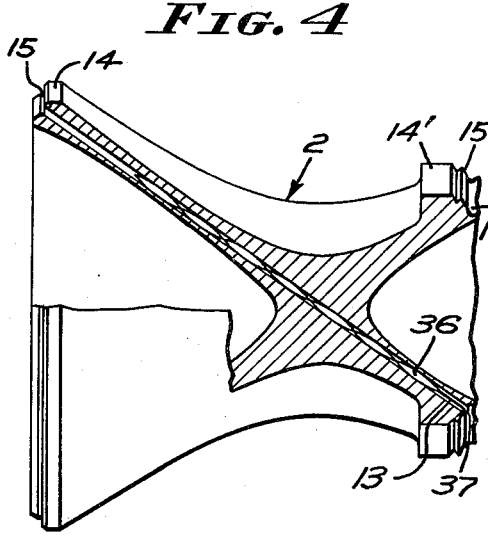
Figs. 4 and 5 are side elevational views, broken away in the plane of one of the cooling passages, showing details of the nozzle section.

In the presently preferred form thereof, a thrust chamber in accord with the instant invention comprises a generally cylindrical combustion section generally designated 1, a nozzle section generally designated 2 which is connected to section 1 at one end thereof, and a nozzle outlet section generally designated 3 which extends from the other end of nozzle section 2 and which preferably is formed integrally therewith.

It is a particular feature of this invention that the thrust chamber sections 1, 2 and 3 are of integral, one-piece construction with cooling passages formed through the sections in a manner such that they are integral therewith, whereby the cooling and structural parts are completely integrated in a manner providing both maximum strength and maximum cooling. To this end, the sections 1, 2 and 3 are formed of a material characterized by a high degree of heat conductivity, such as for example aluminum, and the cooling passages are drilled or cored through the section bodies so as to be an integral part thereof.

Thus, the combustion section 1 comprises a body of highly heat conductive material formed to the generally cylindrical, tubular shape illustrated in Fig. 1, and a number of cooling passages 5 comprising straight, generally axially aligned holes are drilled, cored or otherwise formed through the body of section 1 from end to end thereof in substantially equally spaced relation therearound. In this way the cooling passages 5 extend through section 1 in heat exchange relation to the inner wall surface 6 thereof, and the high heat conductivity of the body enables cooling the material between the passages 5. The passages 5 are formed as holes in the otherwise solid body of section 1, whereby the cooling and structural members are completely integrated.

At the nozzle section end thereof, section 1 is of stepped formation providing a first annular shoulder 7 and a second annular shoulder 8 for a purpose to be described.

The nozzle section 2 comprises an integral member formed of a highly heat conductive material and internally contoured to provide a convergent wall portion 10, a divergent wall portion 11, and a throat portion 12 interconnecting the convergent and divergent portions, whereby the inner wall contour of the nozzle section 2 has a double cone, convergent-divergent effect.

Figure 3:
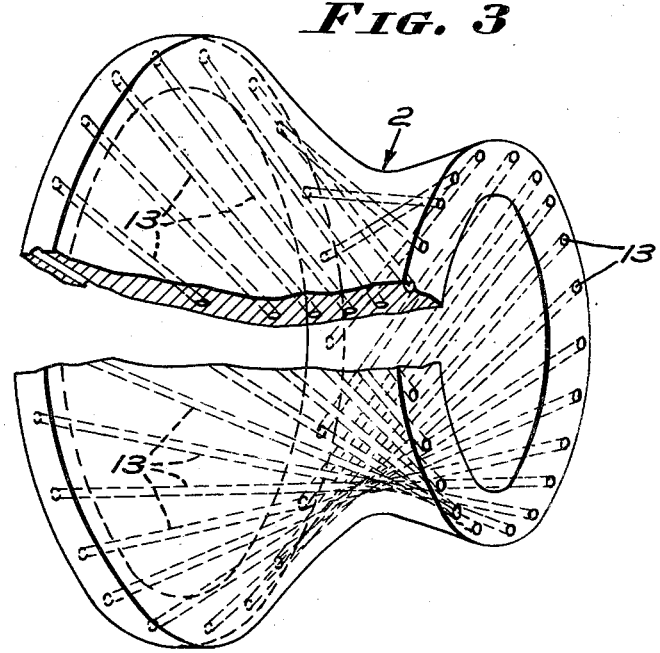
Fig. 3 is a perspective view, partly broken away to show details, of the nozzle section.

In accord with the invention the nozzle section is generated solely by straight lines, the geometrical construction thereof being illustrated in Fig. 3 and described as follows. The generating line, or lines, comprises a straight line lying in a plane parallel to a plane containing the center line or axis of the thrust chamber, the generating line however being inclined relative to the center line. This generating line then is rotated about the throat at a given distance from the center line, and the locus thereby generated forms the convergent-divergent De Laval nozzle shape illustrated in Figs. 1 and 3. The resulting nozzle has a radius at the throat equal to the distance between the center line and the generating line and has convergent and divergent angles determined by the angle of inclination of the generating line relative to the center line. This method of generating the inner nozzle contour enables straight line drilling or coring of the nozzle body to provide cooling passages through the nozzle section while maintaining an external contour corresponding to the internal contour.

Thus, once the inner nozzle contour is formed, the nozzle section 2 is set up at the proper angle, as determined by the angle of inclination of the original generating line, and a number of substantially straight holes comprising cooling passages 13 are drilled therethrough in substantially equally spaced relation therearound, the drilling following the inner nozzle contour and therefore extending along or generally parallel to the line of generation at its different positions around the center line. The passages 13, in effect, correspond to various positions, of which there are an infinite number, of the generating line as it is rotated to generate the inner nozzle contour.

Thus, with this invention the integration of cooling and structural members is maintained even in the convergent-divergent nozzle section having an outer contour following its inner contour.

The convergent end of nozzle section 2 is stepped to provide annular shoulders 14 and 15, and its divergent end is formed to provide annular shoulders 14' and 15' and an annular, rounded groove 16.

In the preferred embodiment, the nozzle outlet section 3 is formed integrally with nozzle section 2 and therefore also comprises a solid body of material possessing a high degree of heat conductivity, and a number of substantially straight, generally axial holes or cooling passages 18 and 19 are drilled or cored therethrough in equally spaced alternating relation therearound to comprise an integral part of the outlet section 3.

At its outer end, section 3 is of stepped formation providing annular shoulders 20 and 21, and an end cap 22 of generally right angular cross section is secured to said shoulders as by welding or the like to define, with the stepped end formation of section 3, a manifold 23 placing the passages 18 and 19 in communication with each other.

It is of course possible to use manifold 23 as the intake manifold for coolant. However, this would require a structure much larger than manifold 23, and in accord with the invention the intake manifold is instead provided around a thrust chamber portion of less diameter and manifold 23 merely places passages 18 and 19 in communication. This is accomplished by the use of multi-pass cooling, and to this end a stepped barrier 24 is formed between the passages 13 of section 2 and the passages 19 of section 3. Passages 18 extend through barrier 24 into communication with groove 16 and passages 13, and slots 25 are milled or otherwise formed in section 3 adjacent barrier 24 through to passages 19. An annular boss 26 is formed on the end of section 3 adjacent slots 25. An intake manifold 28 of rounded, annular form is welded or otherwise secured to the annular bosses 14' and 26 of sections 2 and 3, respectively, and communicates both with passages 19 through slots 25, and with passages 13 through groove 16 and an orifice plate 29 having openings therethrough and positioned on the shoulder 15' of section 2 and on the shouldered barrier 24.

Coolant is supplied to the manifold 28 from a suitable source, not illustrated, as by an inlet conduit 31 which can be secured in position as by a structural brace member 32 extending between the conduit 31 and the nozzle section 2.

At its other end, nozzles section 2 is welded to section 1 along the outer surface of the groove formed between shoulders 8 and 15, and a plate 33 is welded to the sections 1 and 2 on shoulders 7 and 14, respectively, to provide an annular, manifold passage 34 interconnecting the coolant passages 13 in section 2 and the passages 5 in section 1.

It will be appreciated that the thrust chamber cooling of this invention can be regenerative, using the liquid fuel of the rocket engine as a coolant. In accord with the invention, the coolant is supplied to the manifold 28 through the intake conduit 31, and passage through the orifice plate 29 into and through passages 13 in nozzle section 2 and then through manifold 34 and the cooling passages 5 of section 1. Coolant also passes from manifold 28 through the slots 25 into and through passages 19 of section 3 into manifold 23, and then back through passages 18 of section 3 into the manifold provided by the groove 16 and through the passages 13, manifold 34 and passages 5. From section 1 the coolant passes into a fuel injection system, or a suitable collecting and/or recirculating system not shown.

It is a particular feature of the invention that the thrust chamber comprises a solid body construction wherein the coolant and structural parts thereof are completely integrated providing both maximum strength and maximum cooling. Strength is provided by the integrated, solid body construction using a material, such as machined aluminum, possessing considerable mechanical strength, which construction eleminates differential expansion problems. Also internal liquid loads are reduced to a minimum. In addition, the use of a highly heat conductive material provides a lower inside wall temperature and therefore less distortion and thermal expansion.

Cooling is provided by the coolant flowing through the passages, and by the use of highly heat conductive material facilitating heat transfer to the coolant and enabling cooling of the material between the passages.

Also, this construction permits the use of non-strategic and relatively low cost materials, such as aluminum, which also has the advantage of being easily machined, while providing a thrust chamber meeting the desired standards.

Another advantage of the thrust chamber of this invention is that it is adapted for mass production techniques, and it is noted that the thrust chamber construction of this invention is made possible and practical by the development of extremely small diameter drills adapted to drill slender holes of considerable length, to form the cooling passages, and permitting close tolerances to be maintained, such drills being disclosed in United States patent application Serial No. 493,618, now abandoned.

The sections 1, 2 and 3 can comprise three separate sections welded together but this is apt not to be successful and for durability and elimination of cracked welds during firing it is preferred that sections 2 and 3 be formed as a single member. The method of forming the section 2, 3 and of providing cooling passages therethrough in accord with this invention enables such a construction. The passages 13 are drilled from the convergent end of nozzle section 2, and passages 18 and 19 are drilled from the outer end of nozzle outlet section 3. Sections 1 and 2 can be welded, but a joint like that shown in Fig. 1 is required for successful operation. Also, it is contemplated that under some circumstances investment casting might be possible, but it has been found that a very dense material is required to withstand the erosive effects of high temperature gases, and therefore machining of the sections definitely is preferred and, for many purposes at least, necessary. In addition, by machining instead of casting the sections, a construction of much greater strength is provided.

Another particular feature of the invention resides in the arrangement placing the intake manifold close to the nozzle throat. Section 2, 3 is formed with a convergent-divergent outer contour corresponding to the inner contour thereof, which is possible in view of the mechanical strength of this construction, and this together with the multi-pass cooling of section 3 as provided by passages 18 and 19 permits the use of a relatively small diameter manifold 28 positioned as shown, with a corresponding reduction in cost and in weight.

Figure 5:
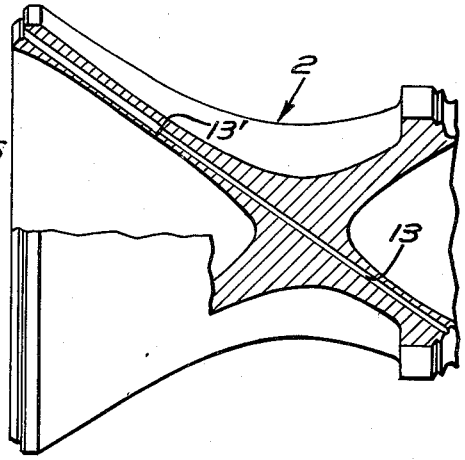

The highly heat-conductive material forming the body of sections 1, 2 and 3 permits the integral construction of this invention and provides for operation at lower temperatures. At the same time, the greater heat transfer raises the problem of having to dissipate more heat, and in accord with the invention this is solved by increasing the velocity of coolant flow through the various passages 5, 13, 18 and 19. One way of accomplishing this is to insert a spinner 36, comprising a member of spiral form, in the passages as necessary, the spinner being spread and staked into slots such as indicated at 37 adjacent the ends of the sections. Such spinners make it possible to use a larger hole for the cooling passages, making the drilling thereof easier, while enabling the attainment of high fluid velocity necessary to accommodate a high heat flux. If necessary to avoid a high pressure drop in the region of the spinners, the diameter of the cooling passages can be varied as illustrated at 13' (Fig. 5), but it has been found that this can be avoided by regulating the length of the spinners 36 and the necessity of using different sized drills on the same passage 13 can be eliminated.

At high chamber pressures such as above 500 p.s.i., and where the chamber has an exceptionally high heat transfer rate, it is contemplated that it might be necessary to alleviate or increase the coolant margin by incoporating thermal barriers in the form of coatings applied to the inside surface of the thrust chamber. Such barriers will possess a low thermal conductivity to reduce heat flux, and must be capable of withstanding high thermal stresses.

It is contemplated that the thrust chamber of this invention can be used as an external heat exchanger, by providing appropriate passages corresponding to the cooling passages in heat exchange relation therewith. Such an arrangement can be used to heat up a fluid such as pressurizing gas in a pressure feed system, and/or as an intermediate heat exchange for cooling the coolant passing through the cooling passages.

Also, it is noted that minimum weight is provided in the combustion section 1 and nozzle section 2 by using a drilling technique. For large nozzle outlet section 3, however, minimum weight is achieved by using a brazed structure welded to section 2.

Accordingly, it is seen that this invention fully accomplishes its intended purpose. While only a presently preferred embodiment is disclosed herein, it is not intended that the invention be limited thereto and it is contemplated that variations therein and modifications thereof can be made without departing from the spirit of the invention and the scope of the appended claims.

Having fully disclosed and completely described our invention, and its mode of operation, what we claim as new is:

1. A hollow thrust chamber nozzle comprising, a member of one piece construction formed of a highly heat conductive material to provide walls for a chamber means having a convergent portion, a divergent portion, and a throat interconnecting said portions, and a number of cooling passages extending in substantially straight line form through said walls in substantially equally spaced relation around said nozzle member.

2. In a hollow thrust chamber for rocket motors and the like, a nozzle member providing walls for a chamber means having a convergent section and a divergent section, and a cooling passage extending through said walls in a substantially straight line inclined to the axis of said nozzle member at substantially the angles of convergence and divergence of said sections.

3. In a hollow thrust chamber for rocket motors and the like, a nozzle member formed of a solid body of material characterized by a high degree of heat conductivity, said nozzle member providing walls for a chamber means having portions of convergent and divergent contour aligned axially thereof, said contours being generated by rotation about the axis of said nozzle member of a substantially straight line offset from said axis and inclined relative thereto, and cooling passages formed in the walls of said member as an integral part thereof and extending therethrough in substantially straight lines similarly inclined relative to said axis.

4. A thrust chamber as set forth in claim 5, together with spinner means of spiral form in said passage to increase the velocity of coolant flow therethrough.

5. A thrust chamber for rocket motors and the like comprising, a nozzle section having a convergent portion, a throat portion, and a divergent portion, first cooling passages extending through said nozzle section from one end to the other thereof, a divergent nozzle outlet section secured to the divergent portion of said nozzle section to form an extension thereof, second and third cooling passages extending through said outlet section from one end to the other thereof, coolant intake manifold means connected to said thrust chamber adjacent the juncture between said nozzle section and said outlet section, said intake manifold means communicating with said first passages and with said second passages, means placing said second passages in communication with said third passages adjacent the end of said outlet section remote from said juncture, and means placing said third passages in communication with said first passages, whereby coolant flows from said intake manifold means substantially directly into said first and second passages and from said second passages through said third passages to said first passages.

6. In a thrust chamber, a member comprising, a nozzle section having a convergent portion, a throat portion, and a divergent portion, and a divergent nozzle outlet section forming an extension of said nozzle section divergent portion, said member comprising an integral, one-piece construction formed of a highly heat conductive material, means providing a number of cooling passages of substantially straight line form extending into said nozzle section from said convergent portion to adjacent said divergent portion thereof, means providing a number of cooling passages of substantially straight line form extending into said nozzle outlet section from the outer end thereof to adjacent said nozzle section divergent portion, and means positioned between said outer end of said nozzle outlet section and the remote end relative thereto of said convergent portion for flowing coolant through said passages.

7. A thrust chamber member as set forth in claim 6, wherein said nozzle section cooling passages lie in planes substantially parallel to planes containing the centerline of said nozzle section, and wherein said nozzle outlet section cooling passages lie substantially in planes containing said centerline.

References Cited in the file of this patent

UNITED STATES PATENTS

| | | |
|---|---|---|
| 2,220,726 | Newcum | Nov. 5, 1940 |
| 2,386,746 | Hess | Oct. 9, 1945 |
| 2,408,112 | Truax et al. | Sept. 24, 1946 |
| 2,523,654 | Goddard | Sept. 26, 1950 |
| 2,544,419 | Goddard | Mar. 6, 1951 |
| 2,625,007 | Truax | Jan. 13, 1953 |
| 2,695,496 | Goddard | Nov. 30, 1954 |

UNITED STATES PATENT OFFICE

CERTIFICATE OF CORRECTION

Patent No. 2,935,841            May 10, 1960

Harry S. Myers et al.

It is hereby certified that error appears in the printed specification of the above numbered patent requiring correction and that the said Letters Patent should read as corrected below.

Column 3, line 53, for "nozzles" read -- nozzle --; line 64, for "passage" read -- passes --; column 6, line 5, for the claim reference numeral "5" read -- 2 --.

Signed and sealed this 8th day of November 1960.

(SEAL)
Attest:

KARL H. AXLINE                          ROBERT C. WATSON
Attesting Officer                     Commissioner of Patents